United States Patent
Watanabe et al.

(10) Patent No.: US 6,295,589 B1
(45) Date of Patent: Sep. 25, 2001

(54) APPARATUS AND METHOD PROHIBITING RAM DIAGNOSIS WHEN OTHER UNITS MAY ACCESS RAM

(75) Inventors: Satoru Watanabe; Kenichi Machida; Manabu Sekine, all of Atsugi (JP)

(73) Assignee: Unisia Jecs Corporation, Kanagawa-Ken (JP)

( * ) Notice: Subject to any disclaimer, the term of this patent is extended or adjusted under 35 U.S.C. 154(b) by 0 days.

(21) Appl. No.: 09/374,511

(22) Filed: Aug. 16, 1999

(30) Foreign Application Priority Data

Aug. 25, 1998 (JP) ................................................. 10-238523

(51) Int. Cl.[7] ...................................................... G06F 12/00
(52) U.S. Cl. ............................................................. 711/163
(58) Field of Search ................................... 711/104, 154, 711/163

(56) References Cited

U.S. PATENT DOCUMENTS 5,036,516  * 7/1991 Cordell ................................... 714/30
5,479,347  * 12/1995 Oguro et al. ..................... 364/424.04
5,829,015  * 10/1998 Maeno ................................. 711/104

FOREIGN PATENT DOCUMENTS 64-19401    1/1989 (JP) .

* cited by examiner

Primary Examiner—Kevin Verbrugge
(74) Attorney, Agent, or Firm—McDermott, Will & Emery

(57) ABSTRACT

Erroneous diagnosis caused by a case where hardware other than an ALU (arithmetical and logic unit) has a function to access a RAM directly due to the construction of a CPU is to be prevented. In order to do so, interrupt is prohibited at every predetermined diagnosis timing. Then, determination is made as to whether a start-up of a DMAC (direct memory access controller) is approved or not, and only when the start-up is not approved, the diagnosis is performed to a diagnosis object RAM by previously determined diagnosis unit bytes at a time through a read/write method. When failure of the RAM is determined, the diagnosis procedure is advanced to an NG process. When the start-up of the DMAC is approved, the diagnosis of the diagnosis object RAM is prohibited, and the address of the object RAM is stored in a memory so that the object RAM is diagnosed at a next diagnosis timing.

12 Claims, 3 Drawing Sheets

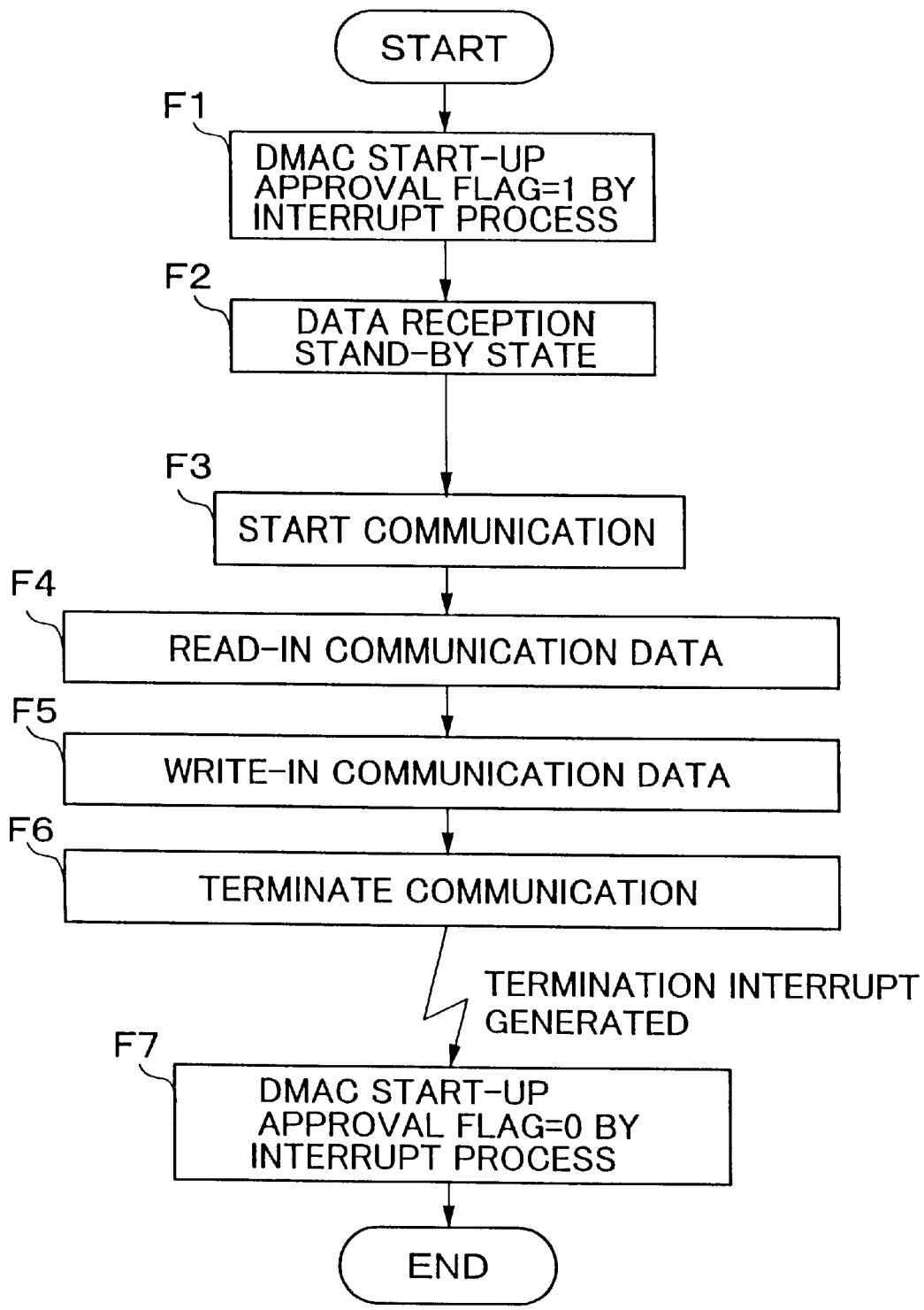

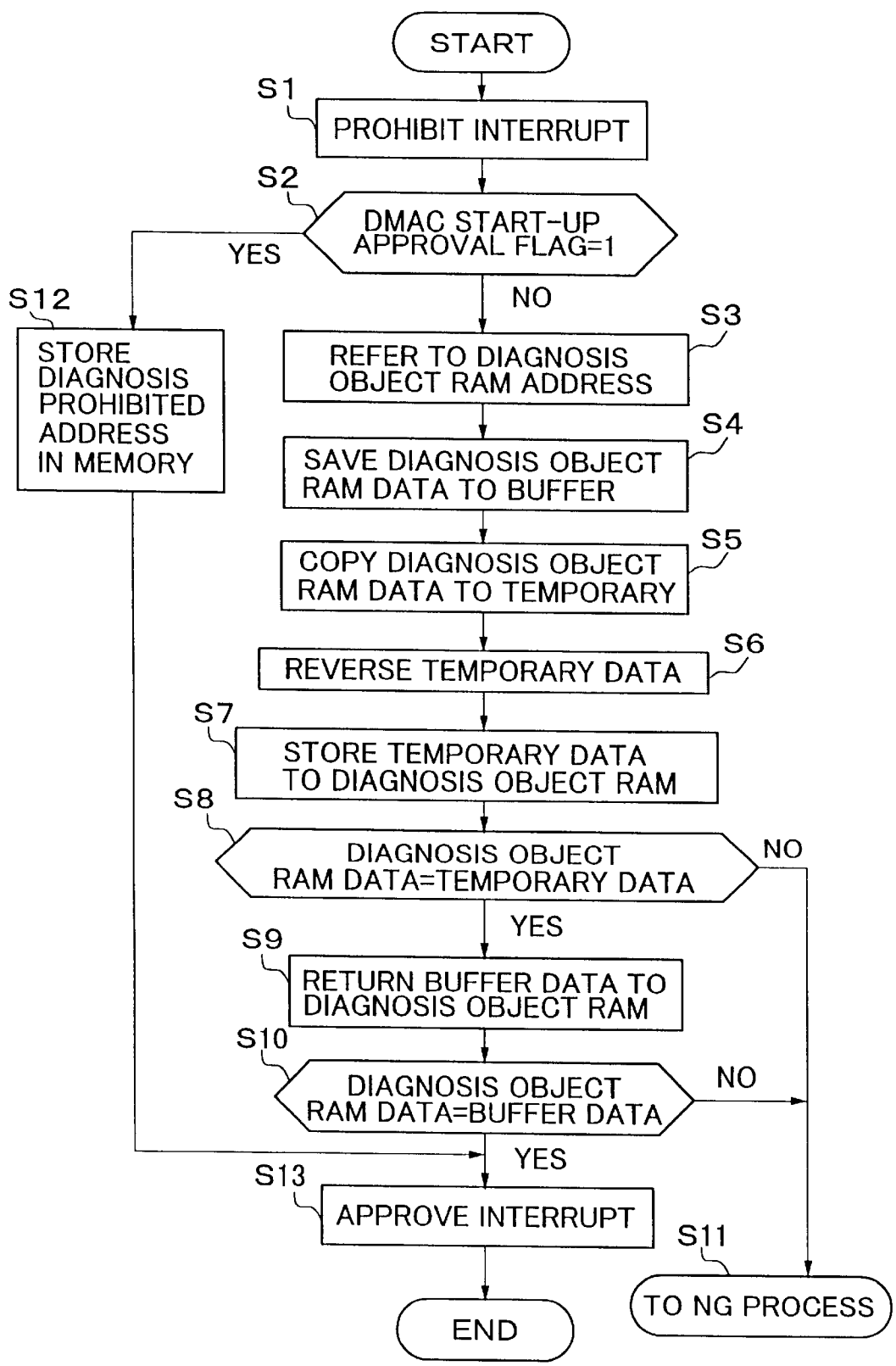

APPARATUS AND METHOD PROHIBITING RAM DIAGNOSIS WHEN OTHER UNITS MAY ACCESS RAM

FIELD OF THE INVENTION

The present invention relates to a diagnosis apparatus and a diagnosis method of a RAM to be used in a microcomputer for controlling various electronic controlled devices in an engine of a vehicle and the like.

DESCRIPTION OF THE RELATED ART

Conventionally, in a control apparatus of an engine mounted on a vehicle, in addition to the self-diagnosis performed by the CPU in the control microcomputer, a diagnosis of the ROM or RAM and the like are performed by the CPU (refer to Japanese Unexamined Patent Publication No. 64-19401).

The diagnosis of the RAM is performed as follows. At every predetermined diagnosis timing, interruption is first prohibited so as to prevent rewriting of the RAM, and then, a read/write check is performed to the diagnosis object RAM by previously determined diagnosis unit bytes (four bytes for example) at a time.

However, due to the CPU construction, when hardware other than the ALU (arithmetical and logic unit) has a function to access the RAM directly, the RAM being diagnosed may be rewritten irrelevantly to orders from the ALU, which will lead to erroneous diagnosis.

For example, when the main CPU and the sub CPU are connected through a communication line, the RAM may be rewritten by a DMAC (direct memory access controller) in the CPU according to communication. Since the DMAC has a high interrupt level, such rewriting of the RAM cannot be prevented even by prohibiting interrupt.

The present invention aims at solving the above-mentioned problem. The object of the present invention is to prevent erroneous diagnosis caused by a case where hardware other than the ALU (arithmetical and logic unit) has a function to access the RAM directly, due to the construction of the CPU.

SUMMARY OF THE INVENTION

In order to achieve the above object, a diagnosis apparatus of a RAM according to the present invention, including a RAM diagnosis device for diagnosing a RAM by a read/write method at every predetermined diagnosis timing and an interrupt prohibiting device for prohibiting interrupt during diagnosis, comprises an external interrupt monitoring device for monitoring a status of external interrupt where hardware other than an arithmetical and logic unit accesses the RAM, and a diagnosis prohibiting device for prohibiting the diagnosis by the RAM diagnosis device when it is determined by the monitoring device that the status enables external interrupt.

According to this construction, the diagnosis of the RAM is prohibited during the state in which external interrupt may occur where hardware other than the ALU (arithmetical and logic unit) may access the RAM. Thereby, erroneous diagnosis caused by a case where the diagnosed RAM being diagnosed may be rewritten irrelevantly to orders from the ALU may be prevented, and the reliability of the RAM diagnosis may therefore be improved.

Further, when the RAM diagnosis device is to perform diagnosis to a diagnosis object RAM by previously determined diagnosis unit bytes at a time, the diagnosis prohibiting device may be not only to prohibit the diagnosis of the diagnosis object RAM, but also to store the address of the diagnosis object RAM in a memory, and to have the diagnosis object RAM diagnosed at a next diagnosis timing.

Accordingly, when the RAM diagnosis is prohibited, the address of the diagnosis object RAM at that time is stored in a memory, and the RAM is diagnosed at the next diagnosis timing, so as to guarantee diagnosis.

The external interrupt monitoring device may be set to monitor whether a start-up of a DMAC (direct memory access controller) is approved or not as the status of external interrupt.

As above, by monitoring whether the start-up of the DMAC (direct memory access controller) is approved or not as the external interrupt status, situations enabling the rewriting of the RAM by the DMAC can be detected assuredly.

Actually, the RAM diagnosis device may be constituted to save data of the diagnosis object RAM to a buffer by previously determined diagnosis unit bytes at a time, and on the other hand, copy the data of the diagnosis object RAM to a temporary, bit-reverse the temporary data, and stores the reversed temporary data to the diagnosis object RAM, before determining whether or not the data of the diagnosis object RAM and the data of the temporary correspond.

Further, the RAM diagnosis device may determine whether or not the data of the diagnosis object RAM and the data of the buffer correspond, after returning the data of the buffer to the diagnosis object RAM.

The RAM diagnosis according to the present invention may advantageously improve the reliability of engine control by making the RAM used in a microcomputer for controlling an engine mounted on a vehicle a diagnosis object.

Characteristic features of the present invention and the resultant function and effects will become more apparent from the following description of embodiment given in conjunction with the appended drawings.

BRIEF DESCRIPTION OF THE DRAWINGS

FIG. 3 is a flowchart showing the state of the start-up of the DMAC; and

FIG. 4 is a flowchart showing the RAM diagnosis.

DETAILED DESCRIPTION OF THE PREFERRED EMBODIMENT

Figure 1:
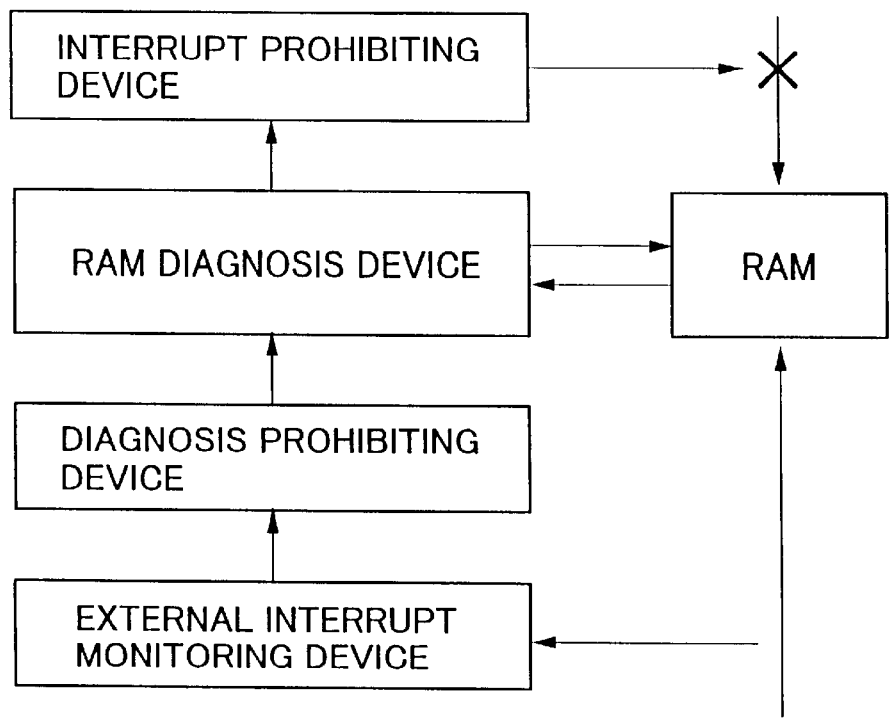
FIG. 1 is a functional block diagram showing the basic construction of the present invention.

The basic construction of a diagnosis apparatus of a RAM according to the present invention is shown in FIG. 1. A preferred embodiment of the invention, especially the embodiment for diagnosing a RAM used in a microcomputer for controlling an engine of a vehicle is explained with reference to FIGS. 2–4.

Figure 2:
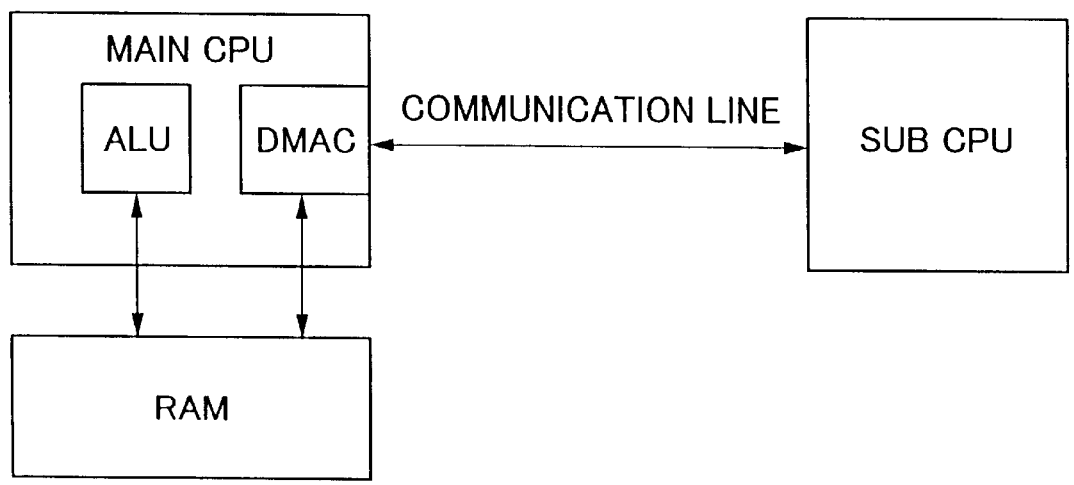
FIG. 2 is a system diagram showing one embodiment of the present invention.

FIG. 2 shows a system construction of a microcomputer for controlling an engine, wherein a main CPU and a sub CPU are connected through a communication line. An ALU (arithmetical and logic unit) and a DMAC (direct memory access controller) are equipped to the main CPU, and both the ALU and the DMAC are enabled to access the RAM directly and to write in the read-in communication data.

FIG. 3 is a flowchart showing the contents of the process at a time of the start-up of the DMAC.

First, according to an interrupt process, a DMAC start-up approval flag (data reception approval flag; bit 0 of CHC Rn) of an inner register is set (F1), and a data reception stand-by state is generated (F2).

Thereafter, communication is started (F3), the communication data is read-in (F4), and the read-in communication data is then written into the RAM (F5), and the communication is terminated (F6).

Then, by the generation of a termination interrupt, and according to an interrupt process, the DMAC start-up approval flag of the inner register is cleared (F7).

FIG. 4 is a flowchart of a RAM diagnosis carried out by the main CPU (the ALU in the main CPU) of the microcomputer. The flowchart shows the contents of the diagnosis to be performed against a diagnosis object RAM by previously determined diagnosis unit bytes (four bytes for example) at every predetermined diagnosis timing (time synchronous for example).

In S1, interrupt is prohibited so as to prevent rewriting of the RAM during diagnosis.

In S2, determination is made on whether the DMAC start-up approval flag (reception approval flag; bit 0 of CHC Rn) of the inner register is set or not.

When it is determined that the DMAC start-up approval flag is not set, in other words, when flag equals 0, the procedure is advanced to S3 for diagnosing the RAM.

In S3, a diagnosis object RAM address is referred to. The diagnosis object RAM address is set by a separate procedure so that four bytes of the diagnosis object RAM is diagnosed for every single flow, and that all addresses of the RAM will be diagnosed finally (the address will be incremented for every single flow after the initial setting).

In S4, the data of the diagnosis object RAM (four bytes of data) based on the diagnosis object RAM address is saved to a buffer.

In S5, the data of the diagnosis object RAM is copied to a temporary (a temporary register in the CPU side).

In S6, the data in the temporary is bit-reversed. Thereby, for example, the data 00000000h becomes FFFFFFFFh.

In S7, the data of the temporary is stored to the diagnosis object RAM.

In S8, the data of the diagnosis object RAM and the data of the temporary are compared.

When difference is found as a result of the comparison, the result of the RAM diagnosis is determined as NG, and the procedure is advanced to S11 where an NG process is started. On the other hand, when the two compared data correspond, the procedure is advanced to S9.

In S9, the data in the buffer is returned to the diagnosis object RAM.

In S10, comparison of the diagnosis object RAM data and the buffer data is performed.

When difference is found as a result of the comparison, the RAM diagnosis is determined as NG, and the procedure is advanced to S11 where the NG process is started. On the other hand, when the two data correspond, the procedure is advanced to S13, where interrupt is permitted, and the present flow is ended. Accordingly, the RAM diagnosis (S3–S10) is prohibited.

As explained, when there is fear that the RAM may be rewritten by the DMAC, such rewriting may not be prevented simply by prohibiting interrupt since DMAC has a high interrupt level, the RAM diagnosis is prohibited during such time, thereby preventing erroneous diagnosis.

However, when the RAM diagnosis is prohibited, the address of the diagnosis object RAM which had been prohibited of diagnosis (diagnosis-prohibited address) is stored in a memory at S12, so that the data in that address is diagnosed at the next diagnosis timing (next cycle).

In the process, S3 through S10 correspond to the RAM diagnosis device, and S1 corresponds to the interrupt prohibiting device. Further, S2 corresponds to the external interrupt monitoring device, and the portion (including S12) for skipping S3 through S10 when it is determined in S2 that the flag equals 1 corresponds to the diagnosis prohibiting device.

As an example of the NG process (S11), the power of the equipment being controlled will be turned off. For example, when the control apparatus of an engine mounted on a vehicle controls an electronically controlled throttle valve, the relay of the power source circuit to the motor of the electronically controlled throttle valve is turned off. When the relay is turned off, the opening of the electronically controlled throttle valve will be fixed to a fail-safe opening, which is relatively small, by the action of a return spring. This will limit the engine output, but still enables a limphome operation of the vehicle with minimum engine output.

Moreover, the RAM diagnosis method should not be limited to the method shown in FIG. 4, and for example, a step may be added between S4 and S5, where a predetermined four byte data, AAAAAAAAh for example, is stored to the diagnosis object RAM. In this case, when the copied temporary data is bit-reversed at S6, and if the RAM is normal, the data AAAAAAAAh will be 55555555h.

As explained, according to the present invention, the RAM diagnosis is prohibited during the state in which external interrupt may occur where hardware other than the ALU (arithmetical and logic unit) may access the RAM, so as to prevent erroneous diagnosis caused by a case where the RAM being diagnosed may be rewritten irrelevantly to orders from the ALU. Thereby, the reliability of the RAM diagnosis may be improved, and as a result, the reliability of the engine control utilizing the present RAM diagnosis method and apparatus may also be improved, thus having widespread industrial applicability.

What we claimed are:

1. A diagnosis apparatus of a RAM comprising:
    a RAM diagnosis means for diagnosing a RAM by a read/write method at every predetermined diagnosis timing;
    an interrupt prohibiting means for prohibiting interrupt during diagnosis;
    an external interrupt monitoring means for monitoring a status of external interrupt where hardware other than an arithmetical and logic unit accesses said RAM; and
    a diagnosis prohibiting means for prohibiting said diagnosis of said RAM diagnosis means when it is determined by said monitoring means that said status enables external interrupt.

2. A diagnosis apparatus of a RAM according to claim 1, wherein said RAM diagnosis means performs diagnosis to a diagnosis object RAM by previously determined diagnosis unit bytes at a time; and
    said diagnosis prohibiting means not only prohibits said diagnosis of said diagnosis object RAM, but also stores the address of said diagnosis object RAM in a memory, so as to have said diagnosis object RAM diagnosed at a next diagnosis timing.

3. A diagnosis apparatus of a RAM according to claim 1, wherein said external interrupt monitoring means monitors whether a start-up of a direct memory access controller is approved or not as said status of external interrupt.

4. A diagnosis apparatus of a RAM according to claim 1, wherein said RAM diagnosis means saves data of a diagnosis object RAM to a buffer by previously determined diagnosis unit bytes at a time, and on the other hand, copies the data from said diagnosis object RAM to a temporary, bit-reverses said temporary data, and stores said reversed temporary data to said diagnosis object RAM, before determining whether or not said data of said diagnosis object RAM and said data of said temporary correspond.

5. A diagnosis apparatus of a RAM according to claim 4, wherein said RAM diagnosis means determines whether or not the data of said diagnosis object RAM and the data of said buffer correspond, after returning the data from said buffer to said diagnosis object RAM.

6. A diagnosis apparatus of a RAM according to claim 1 wherein a RAM used in a microcomputer for controlling an engine mounted on a vehicle is made to be a diagnosis object.

7. A diagnosis method of a RAM comprising the steps of:
diagnosing a RAM through a read/write method at every predetermined diagnosis timing and prohibiting interrupt during said diagnosis; and
monitoring a status of external interrupt where hardware other than an arithmetical and logic unit accesses said RAM, and when it is determined that said status enables external interrupt, prohibiting said diagnosis of said RAM.

8. A diagnosis method of a RAM according to claim 7, wherein said RAM diagnosis is performed to a diagnosis object RAM by previously determined diagnosis unit bytes at a time; and when prohibiting said diagnosis, the diagnosis of said diagnosis object RAM is prohibited, and the address of said diagnosis object RAM is stored in a memory, so as to have said diagnosis object RAM diagnosed at a next diagnosis timing.

9. A diagnosis method of a RAM according to claim 7, wherein monitoring is performed as to whether a start-up of a direct memory access controller is approved or not as said status of external interrupt.

10. A diagnosis method of a RAM according to claim 7, wherein said RAM diagnosis is performed by saving data of a diagnosis object RAM to a buffer by previously determined diagnosis unit bytes at a time, and on the other hand, copying the data from said diagnosis object RAM to a temporary, bit-reversing said temporary data, and storing said reversed temporary data to said diagnosis object RAM, before determining whether or not said data of said diagnosis object RAM and said data of said temporary correspond.

11. A diagnosis method of a RAM according to claim 10, wherein said RAM diagnosis is performed by determining whether or not said data of said diagnosis object RAM and said data of said buffer correspond, after returning said data of said buffer to said diagnosis object RAM.

12. A diagnosis method of a RAM according to claim 7, wherein said RAM used in a microcomputer for controlling an engine mounted on a vehicle is made to be a diagnosis object.

* * * * *